(12) United States Patent
Narita et al.

(10) Patent No.: US 11,362,557 B2
(45) Date of Patent: Jun. 14, 2022

(54) ELECTRIC MOTOR AND FIELD ELEMENT

(71) Applicant: AICHI STEEL CORPORATION, Tokai (JP)

(72) Inventors: Atsushi Narita, Aichi-ken (JP); Aki Watarai, Aichi-ken (JP)

(73) Assignee: AICHI STEEL CORPORATION, Tokai (JP)

( * ) Notice: Subject to any disclaimer, the term of this patent is extended or adjusted under 35 U.S.C. 154(b) by 101 days.

(21) Appl. No.: 16/981,518

(22) PCT Filed: Mar. 26, 2019

(86) PCT No.: PCT/JP2019/012801
§ 371 (c)(1),
(2) Date: Sep. 16, 2020

(87) PCT Pub. No.: WO2019/189143
PCT Pub. Date: Oct. 3, 2019

(65) Prior Publication Data
US 2021/0013755 A1    Jan. 14, 2021

(30) Foreign Application Priority Data
Mar. 30, 2018   (JP) .............................. JP2018-069541

(51) Int. Cl.
*H02K 1/27*    (2022.01)
*H02K 1/02*    (2006.01)
(Continued)

(52) U.S. Cl.
CPC ................. *H02K 1/28* (2013.01); *H02K 1/02* (2013.01); *H02K 1/276* (2013.01)

(58) Field of Classification Search
CPC ............ H02K 1/28; H02K 1/276; H02K 1/02; H02K 2213/03; H01F 1/083
See application file for complete search history.

(56) References Cited

U.S. PATENT DOCUMENTS

2014/0001890 A1*   1/2014 Ota ..................... H02K 1/2733
                                                        310/43

FOREIGN PATENT DOCUMENTS

JP          05-199686 A     8/1993
JP          3690067 B2     8/2005
(Continued)

OTHER PUBLICATIONS

International Search Report for PCT/JP2019/012801 dated May 21, 2019 (PCT/ISA/210).
(Continued)

*Primary Examiner* — Thomas Truong
(74) *Attorney, Agent, or Firm* — Sughrue Mion, PLLC

(57) ABSTRACT

An electric motor for reducing eddy current loss including an armature; a field element or permanent magnet as a magnetic source; and a shaft rotating together with the armature or field element. The permanent includes magnet particles bound together by a binder resin, and has a degree of electric resistance anisotropy ($\rho 1/\rho 2$) of 2 or more. The first electric resistivity ($\rho 1$) is measured in an axial direction and a second electric resistivity ($\rho 2$) is measured in a direction perpendicular to the axial direction. The bonded magnet is, for example, a compression-molded bonded magnet that contains 93% to 98.5% of the magnet particles, and the first electric resistivity is 300 $\mu\Omega$m or more. When the compression-molded bonded magnet whose compression direction is arranged along the axial direction is used as a field source, the eddy current loss occurring in the compression-molded bonded magnet can be efficiently reduced.

7 Claims, 2 Drawing Sheets

(51) Int. Cl.
*H02K 1/28* (2006.01)
*H02K 1/276* (2022.01)

(56) References Cited

FOREIGN PATENT DOCUMENTS

| | | |
|---|---|---|
| JP | 2008236844 A | 10/2008 |
| JP | 2009-033958 A | 2/2009 |
| JP | 2011-259701 A | 12/2011 |

OTHER PUBLICATIONS

Communication dated Dec. 2, 2021 from the Indian Patent Office in Indian Application No. 202017042068.

* cited by examiner

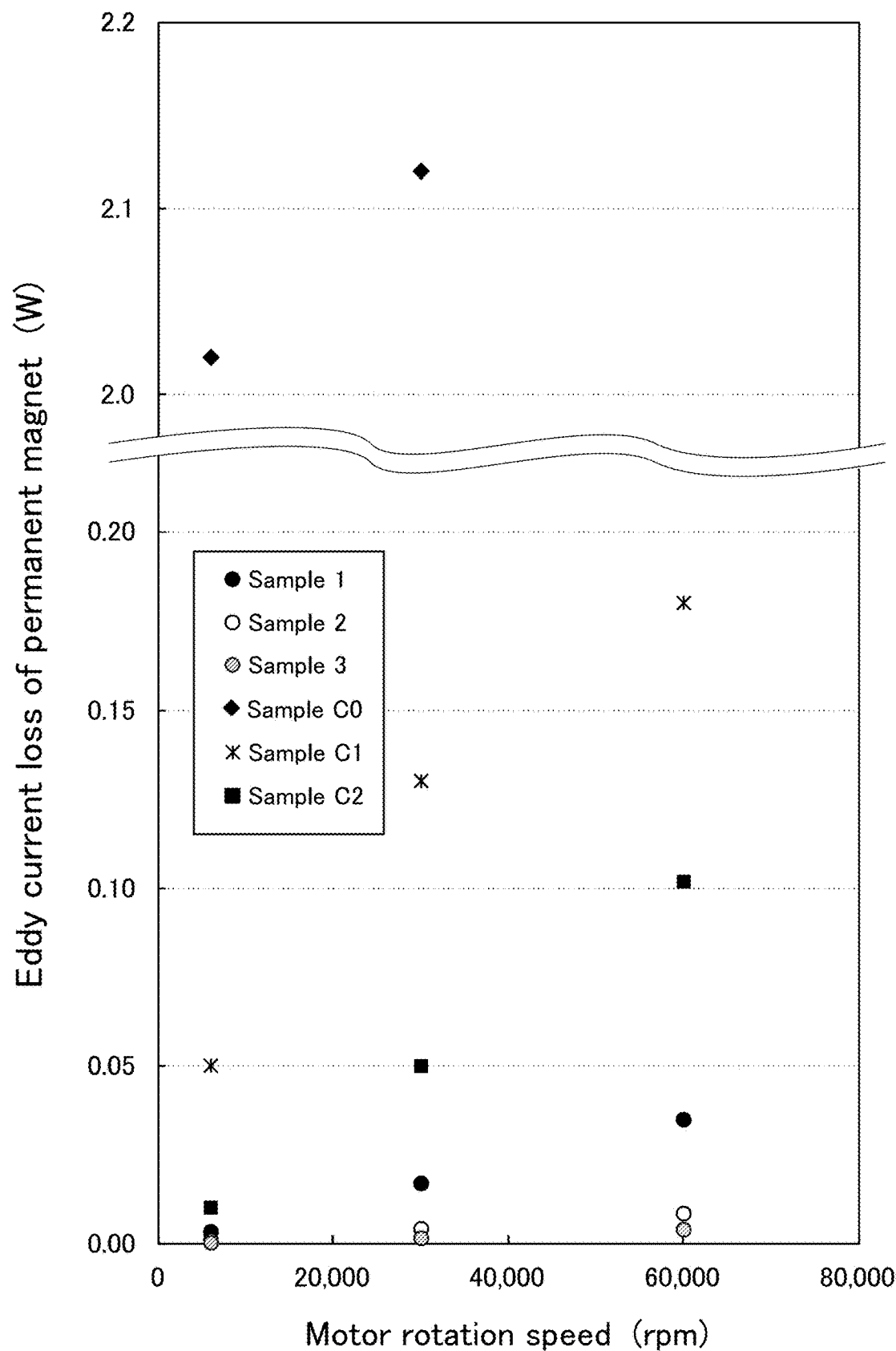

ELECTRIC MOTOR AND FIELD ELEMENT

CROSS REFERENCE TO RELATED APPLICATIONS

This application is a National Stage of International Application No. PCT/JP2019/012801 filed Mar. 26, 2019, claiming priority based on Japanese Patent Application No. 2018-069541 filed Mar. 30, 2018.

TECHNICAL FIELD

The present invention relates to an electric motor etc. that can reduce the eddy current loss.

BACKGROUND ART

There are various types of electric motors (simply referred to as "motors," including generators). For example, existing electric motors include those, such as winding field-type motors and induction machines, which do not use permanent magnets as the magnetic sources (field sources). On the other hand, with the development of rare-earth magnets having excellent magnetic characteristics, high-performance motors using permanent magnets as the field sources have been widely used.

Motors obtain the rotational force using the change in the interlinkage magnetic flux. When a motor rotates, therefore, a change in the magnetic flux occurs in each part of the armature and field element as a matter of course. In a direction to cancel the change in the magnetic flux, eddy current is generated in response to the time rate of change in the magnetic flux. The generation of eddy current results in energy loss (so-called "eddy current loss"). To reduce the eddy current loss, the casing (such as core, yoke, or housing) of the rotor and/or stator which constitute the motor is usually formed of a laminate in which thin magnetic steel sheets coated with an insulating material are laminated in the axial direction.

Such a situation also applies to permanent magnets, which are field sources. For example, the electric resistivity of a rare-earth sintered magnet is very low because the magnet particles made of an alloy are directly bonded. Accordingly, when a motor using a rare-earth sintered magnet as the field source is operated, a large eddy current loss may also occur in the rare-earth sintered magnet. To reduce the eddy current loss occurring in a rare-earth sintered magnet, the rare-earth sintered magnet may be divided and arranged into several pieces with insulators. Descriptions relevant to this are found, for example, in the following document.

PRIOR ART DOCUMENT

Patent Document

[Patent Document 1] JP3690067B

SUMMARY OF INVENTION

Technical Problem

Recently, bonded magnets having a large degree of freedom in the shape and excellent in the productivity and yield have come to be used as substitute for sintered magnets. In the case of bonded magnets, the resin binding the magnet particles (simply referred to as a "binder resin") also serves as an insulating material between adjacent magnet particles. As a consequence, compared with sintered magnets, bonded magnets have extraordinarily high electric resistivity and very small eddy current loss.

In recent years, however, motors are required to have higher output, and the rotation speed tends to increase. The eddy current loss increases in proportion to the square of the frequency at which the magnetic flux changes; therefore, if the rotation speed of a motor increases by N times, the eddy current loss increases rapidly by $N^2$ times. Thus, in order to achieve both the higher performance and the higher efficiency of a motor at a higher level, it is preferred that the eddy current loss of a bonded magnet itself can be further reduced.

The present invention has been made in view of such circumstances and an object of the present invention is to provide an electric motor etc. including a bonded magnet that is effective in further reducing the eddy current loss.

Solution to Problem

As a result of intensive studies to achieve the above object, the present inventors have successfully obtained a bonded magnet whose electric resistivity in a specific direction is considerably higher than that in other directions. The inventors have conceived of an idea of using that bonded magnet as the field source of an electric motor to reduce the eddy current loss and confirmed its effect. Developing this achievement, the present inventors have accomplished the present invention, which will be described below.

«Electric Motor»

(1) The electric motor of the present invention is an electric motor comprising: an armature; a field element using a permanent magnet as a magnetic source; and a rotating shaft rotating together with the armature or the field element. The permanent magnet is a bonded magnet comprising magnet particles and a binder resin that binds the magnet particles to each other. The bonded magnet has a degree of electric resistance anisotropy ($\rho 1/\rho 2$) of 2 or more. The degree of electric resistance anisotropy is a ratio of a first electric resistivity ($\rho 1$) in an axial direction and a second electric resistivity ($\rho 2$) in a direction perpendicular to the axial direction.

(2) The electric motor of the present invention uses, as the field element, a bonded magnet whose electric resistivity is considerably high with respect to the axial direction in which the eddy current loss occurs. This can suppress an increase in the eddy current loss occurring in the permanent magnet even when the rotation speed of the electric motor increases. Thus, the present invention can provide an electric motor that achieves both the higher output and the higher efficiency at a higher level.

«Field Element»

The present invention can also be perceived as a field element used in the above-described electric motor. That is, the present invention may be a field element using a permanent magnet as a magnetic source. The permanent magnet is a bonded magnet comprising magnet particles and a binder resin that binds the magnet particles to each other. The bonded magnet has a degree of electric resistance anisotropy ($\rho 1/\rho 2$) of 3 or more. The degree of electric resistance anisotropy is a ratio of a first electric resistivity ($\rho 1$) in an axial direction and a second electric resistivity ($\rho 2$) in a direction perpendicular to the axial direction.

«Others»

(1) The electric motor (this term includes a generator) as referred to in the present specification is not limited in its type, provided that a permanent magnet is used as the magnetic source (field source). Any of the armature and the field element may be a rotor or a stator. The electric motor may be a DC electric motor or an AC electric motor. The rotor may be an inner rotor or an outer rotor.

The "axial direction" as referred to in the present specification is the extending direction of the rotating shaft of the electric motor. The axial direction is also the direction in which the axis of an approximated cylindrical or approximately hollow cylindrical field element extends. The "circumferential direction" is a direction around the axis, and the "radial direction" is a direction that extends radially from the axis.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit.

BRIEF DESCRIPTION OF DRAWINGS

FIG. 2 is a scatter diagram illustrating the relationship between the rotation speed of a motor and the eddy current loss occurring in various permanent magnets.

EMBODIMENTS FOR CARRYING OUT THE INVENTION

Figure 1:
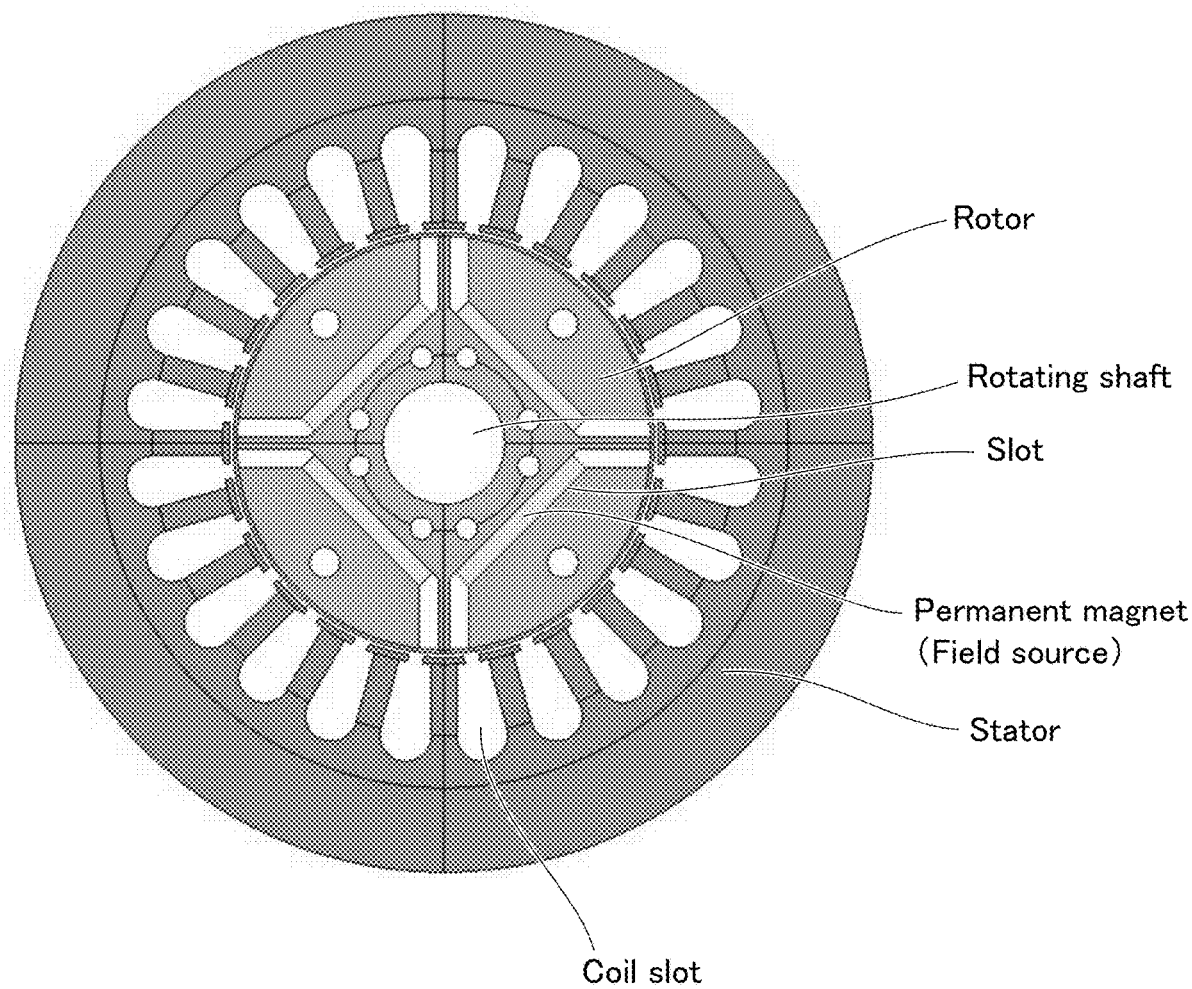
FIG. 1 is a cross-sectional view of a model (electric motor) used for analysis of the eddy current loss.

One or more features freely selected from the matters described in the present specification can be added to the above-described features of the present invention. Methodological features regarding a manufacturing method can also be features regarding a product. Which embodiment is the best or not is different in accordance with objectives, required performance, and other factors.

«Electric Resistivity/Degree of Electric Resistance Anisotropy»

The bonded magnet according to the present invention preferably has a degree of electric resistance anisotropy ($\rho 1/\rho 2$) of 2 or more in an embodiment, 2.5 or more in another embodiment, 3 or more in still another embodiment, 3.1 or more in yet another embodiment, or 3.2 or more in a further embodiment. The degree of electric resistance anisotropy ($\rho 1/\rho 2$) is the ratio of a first electric resistivity ($\rho 1$) measured in the axial direction to a second electric resistivity ($\rho 2$) measured in a direction perpendicular to the axial direction.

The electric resistivity as referred to in the present specification is obtained by measurement according to a 4-terminal method. When the electric resistivity in directions perpendicular to the axial direction differs depending on the measurement direction, the average value of electric resistivity values obtained by measurement in at least two directions (e.g., two directions orthogonal to each other) of the directions perpendicular to the axial direction is employed as the second electric resistivity. When the bonded magnet is an anisotropic bonded magnet molded in an oriented magnetic field, the orientated magnetic field is usually applied from a direction perpendicular to the compression direction (this compression direction is the axial direction when the bonded magnet is assembled into an electric motor). In this case, the electric resistivity in the orientation direction (e.g., radial direction) and the electric resistivity in a direction perpendicular to the orientation direction (e.g., circumferential direction) may be measured as the electric resistivity values in the directions perpendicular to the compression direction (axial direction), and the average value of these values may be employed as the second electric resistivity.

The bonded magnet according to the present invention preferably has, in addition to the high degree of electric resistance anisotropy, for example, the first electric resistivity of 300 μΩm or more in an embodiment, 500 μΩm or more in another embodiment, 1000 μΩm or more in still another embodiment, 2000 μΩm or more in yet another embodiment, 3000 μΩm or more in a further embodiment, or 7000 μΩm or more in a still further embodiment because in such a case the eddy current loss can be further reduced.

«Bonded Magnet»

(1) The bonded magnet is composed of magnet particles and a binder resin. The magnet particles are preferably rare-earth magnet particles having excellent magnetic characteristics, but may also be other magnet particles (e.g., ferrite particles or the like). The magnet particles are not limited to one type of magnet particles and may be a mixture of two or more types having different compositions and/or particle size distributions. The magnet particles may be any of isotropic magnet particles and anisotropic magnet particles. When using anisotropic magnet particles, the bonded magnet is preferably molded in an oriented magnetic field.

The binder resin may be any of a thermoplastic resin and a thermosetting resin. When using a thermosetting resin, thermosetting treatment (curing treatment) is preferably performed after molding.

(2) The bonded magnet may be an injection-molded bonded magnet, but a compression-molded bonded magnet is preferred. In the case of a compression-molded bonded magnet, the amount of binder resin can be reduced to increase the amount of magnet particles. For this reason, the compression-molded bonded magnet usually has a larger magnetic flux density than that of an injection-molded bonded magnet and is suitable for increasing the output of an electric motor.

The compression-molded bonded magnet may be obtained by compression-molding the magnetic particles and the binder resin to which a (liquid) lubricant is added. The lubricant mixed or added or subjected to other similar treatment before the compression molding may leak out to the outside during the compression molding or may be released during the curing treatment, if any. Although the reason is not clear, it appears that when even a small amount of such a lubricant remains in the bonded magnet, the behavior of the lubricant makes the electric resistivity in the compression direction higher than the electric resistivity in other directions and contributes to the expression of the above-described degree of electric resistance anisotropy.

Even if a large amount of lubricant is added before the compression molding, only a small amount of the lubricant remains in the bonded magnet after the compression molding and further after the curing treatment. For example, the lubricant may remain in the bonded magnet as a whole (100 mass %) at more than 0% and 2.5% or less in an embodiment, 0.02% to 2.0% in another embodiment, 0.1% to 1.8% in still another embodiment, 0.3% to 1.5% in yet another embodiment, 0.5% to 1.2% in a further embodiment, or 0.6% to 1% in a still further embodiment. Even a small amount of the residual lubricant can improve the first electric resistivity. Note, however, that if the remaining amount is unduly large, the magnetic characteristics may be deteriorated.

The lubricant for use may be a lubricating oil that is liquid at room temperature (e.g., the melting point is 15° C. or lower), a solid substance that is solid at room temperature (wax or an internal lubricant for molding, such as zinc stearate), or the like. The lubricating oil is excellent in dispersibility in the entire raw material (mixed raw material of the magnet powder and the binder resin) and therefore in the entire molded body and readily expresses the degree of electric resistance anisotropy. The lubricating oil for use may be, for example, any of various esters (such as a fatty acid ester and a polyol ester). The lubricant in a form of being attached to the surface of the molded body or in other similar form may be appropriately removed by degreasing treatment.

(3) As a specific example, the compression-molded bonded magnet is obtained as follows. When the bonded magnet as a whole is 100 mass % (simply referred to as "%"), a mold is filled with the binder resin: 1.5% to 5%, the lubricant: 2% to 15%, and the balance: magnet powder (further, a trace amount of a treating agent (such as surfactant) and impurities). Warm compression molding is performed under the condition of a molding temperature (mold temperature): 100° C. to 150° C., a molding pressure: 49 to 490 MPa, and an oriented magnetic field: 0.5 to 3 T. When a thermosetting resin such as an epoxy resin is used as the binder resin, the molded body may be heated to 100° C. to 180° C. to perform the thermosetting treatment (curing treatment) and a high-strength bonded magnet can thereby be obtained. Preferably, after the molding is performed and then the field element is assembled into the casing (field core), magnetization may be performed (magnetizing magnetic field: 2 to 6 T). The compression-molded bonded magnet may preferably be arranged so that the compression direction is along the axial direction of the field element, as a matter of course.

(4) The bonded magnet obtained by compression molding in an oriented magnetic field using rare-earth anisotropic magnet powder (such as Nd—Fe—B-based magnet powder, Sm—Fe—N-based magnet powder, or Sm—Co-based magnet powder) has, for example, the following specs and characteristics: the content of the magnet particles is 93% to 98.5% in an embodiment or 95% to 97% in another embodiment when the bonded magnet as a whole is 100 mass %; the density of the bonded magnet is 5.5 to 6.3 g/cm$^3$ in an embodiment or 5.7 to 6.1 g/cm$^3$ in another embodiment; the magnetic flux density (Br) is 0.7 to 0.95 T in an embodiment or 0.8 to 0.9 T in another embodiment; the Hk value (value of the magnetic field in the demagnetization curve when corresponding to 90% of Br) which is an index of squareness is 398 to 597 kA/m in an embodiment or 478 to 557 kA/m in another embodiment; the maximum energy product (BHmax) is 111 to 151 kJ/m$^3$ in an embodiment or 115 to 147 kJ/m$^3$ in another embodiment; and the first electric resistivity ($\rho$) is 300 to 20000 $\mu\Omega$m in an embodiment, 500 to 20000 $\mu\Omega$m in another embodiment, 1000 to 20000 $\mu\Omega$m in still another embodiment, or 3000 to 20000 $\mu\Omega$m in yet another embodiment (in the compression direction). As an example, the first electric resistivity is preferably 1000 to 12000 $\mu\Omega$m and the magnetic flux density (Br) is preferably 0.8 to 0.9 T because in this case both the first electric resistivity and the magnetic flux density (Br) can be achieved at a high level.

«Electric Motor»

Application of the electric motor is not limited, but the electric motor is suitable for, for example, a motor for driving a vehicle used in an electric vehicle, a hybrid vehicle, a railroad vehicle, or the like or a motor for an electric home appliance used in an air conditioner, a refrigerator, a washing machine, or the like. The electric motor can be restated as a rotating machine including a generator.

EXAMPLES

Various permanent magnets (rare-earth magnets) were manufactured and their electric characteristics (electric resistivity) and magnetic characteristics (magnetic flux density, relative permeability) were measured. On the basis of the results, the eddy current loss when each permanent magnet is loaded into a slot of the rotor core of a permanent magnet-embedded motor (interior permanent magnet synchronous motor, simply referred to as an "IPM motor") is obtained by simulation. The present invention will be described in detail below based on these specific examples.

«Samples»

(1) Raw Materials

Magnet powders were prepared, which are a commercially available NdFeB-based anisotropic magnet powder that is an Nd-based magnet powder (coarse powder) (MAGFINE available from AICHI STEEL CORPORATION, Br: 1.28 T, iHc: 1313 kA/m, average particle diameter: 100 μm) and a commercially available SmFeN-based anisotropic magnet powder that is an Sm-based magnet powder (fine powder) (SmFeN alloy fine powder D available from Sumitomo Metal Mining Co., Ltd., Br: 1.10 T, iHc: 1170 kA/m, average particle diameter: 3 μm).

Binder resins were prepared, which are an epoxy resin that is a thermosetting resin (K-60 available from Nippon Kayaku Co., Ltd.) and polyphenylene sulfide (PPS) that is a thermoplastic resin.

(2) Manufacturing of Compression-Molded Bonded Magnets (Samples 1, 2, 3, and C1)

For each of Samples 1 to 3, the Nd-based magnet powder and the Sm-based magnet powder were weighed at a mass ratio of 8:2 and mixed well using a Henschel mixer. Solid epoxy resin was added to the mixed magnetic powders, and the mixture was heated and kneaded (110° C.) using a Banbury mixer. A compound used as the raw material powder was thus obtained. The ratio of the thermosetting resin to the compound as a whole (100 mass %) was set to 2.75 mass %.

For each sample, the compound charged into the cavity of a mold was warm-molded in a magnetic field (1.5 T). At that time, the molding temperature was set to 120° C. in all cases. The molding pressure for Samples 1 and 2 was set to 196 MPa, and the molding pressure for Sample 3 was set to 98 MPa. Cubic shaped molded bodies of 14×14×14 mm were thus obtained.

Each molded body was heated in the air at 150° C. for 1 hour (curing treatment) to thermally cure the binder resin (epoxy resin). The molded body after the curing treatment was magnetized in a magnetic field of about 6 T. A compression-molded bonded magnet (material under test) according to each sample was thus obtained.

For Samples 2 and 3, before the compression molding, polyol ester (UNISTAR H-481R available from NOF CORPORATION), which is a lubricating oil (lubricant), was added from above the charged compound. The addition amount was set to 9 mass % (10 mass parts) with respect to the compound as a whole (100 mass parts). Sample 1 was compression-molded without adding lubricating oil.

Samples 2 and 3 are different in the molding pressures. The lower the molding pressure, the lower the density of the molded body, and the amount of the lubricating oil remaining inside increases. This is the same after the curing treatment. The amount of the lubricating oil remaining in the bonded magnet after the curing treatment (residual lubricant amount) was 0.5 mass % in Sample 2 and 1.0 mass % in Sample 3 with respect to the bonded magnet as a whole (100 mass %).

The residual lubricant amount is the mass difference obtained by subtracting the gross mass of the compound charged into the cavity of the mold (total mass of the magnet powder and the binder resin before the compression molding) from the mass of the bonded magnet after the curing treatment.

Sample C1 is a commonly used conventional compression-molded bonded magnet. Sample C1 was manufactured by changing the following points with respect to Sample 1. Magnet powders were used, which are a commercially available NdFeB-based anisotropic magnet powder that is an Nd-based magnet powder (coarse powder) (MAGFINE available from AICHI STEEL CORPORATION, Br: 1.36 T, iHc: 1075 kA/m, average particle diameter: 100 μm) and a commercially available SmFeN-based anisotropic magnet powder that is an Sm-based magnet powder (fine powder) (SmFeN alloy fine powder C available from Sumitomo Metal Mining Co., Ltd., Br: 1.38 T, iHc: 852 kA/m, average particle diameter: 3 μm).

Bisphenol A (Epicoat 1004), which is a thermosetting resin, was used as the binder resin. The ratio of the binder resin was set to 2.0 mass % with respect to the compound as a whole (100 mass %). The compression molding was carried out as warm molding (molding temperature: 120° C., molding pressure: 882 MPa) in a magnetic field (1.5 T). Of course, the compression molding was carried out without adding the lubricating oil or the like used in Samples 2 and 3.

(3) Manufacturing of Injection-Molded Bonded Magnet (Sample C2)

The Nd-based magnet powder and the Sm-based magnet powder weighed at a mass ratio of 7:3 and the thermoplastic resin were kneaded using a biaxial kneader while being heated (300° C.). The obtained kneaded material was cut into pellets (single grain: φ1 to 2 mm×2 to 3 mm). The ratio of the thermoplastic resin to the pellets as a whole (100 mass %) was set to 10 mass %.

The pellets were charged into the hopper of an injection molding machine and heated to fill the cavity of a mold with the molten mixture. An injection-molded bonded magnet having the same shape as the previously described compression-molded bonded magnet was thus obtained. The injection molding was performed under the condition of a mold temperature: 140° C. and a nozzle temperature: 300° C. while applying an oriented magnetic field (1.7 T) to the cavity of the mold, and a cylindrical molded body of φ20 mm×height 13 mm was obtained. Then, after measurement of the magnetic characteristics, the molded body was processed into a cubic shape of 11×11×11 mm, and the electric resistivity was measured. The previously described lubricating oil was not added at the time of injection molding.

(4) Sintered Magnet (Sample C0)

A commercially available rare-earth anisotropic sintered magnet (N40SH available from NeoMag Co., Ltd.) was also prepared as a comparative sample for reference.

《Measurement》

(1) Electric Characteristics

For each sample (permanent magnet), the electric resistance in three orthogonal directions was measured by the 4-terminal method, and the electric resistivity in each direction was obtained. For each sample, the maximum value of the electric resistivity in the three directions was employed as the first electric resistivity ($\rho 1$). The average value of the electric resistance values in the remaining two directions was employed as the second electric resistance. The first electric resistivity and second electric resistivity of each sample thus obtained are listed in Table 1.

In all of Samples 1 to 3 and C1, the electric resistivity measured along the compression direction was the highest among the electric resistivity values in the three directions. The first electric resistivity values of these samples are therefore the electric resistivity values along the compression direction.

In Sample C2, the electric resistivity in the injection direction (flow direction of the molten mixture) was the highest among the electric resistivity values in the three directions. The electric resistivity was therefore employed as the first electric resistivity. The remaining two directions are the orientation direction and the direction perpendicular to the injection direction and the orientation direction. The average value of the electric resistivity values measured in the two directions was employed as the second electric resistivity.

(2) Magnetic Characteristics

The magnetic characteristics of each sample were measured at room temperature using a DC BH tracer (TRF-5BH-25Auto available from Toei Industry Co., Ltd). The obtained residual magnetic flux density (Br) and relative permeability are also listed in Table 1.

《Simulation》

(1) Configuration Model

The eddy current loss when using the permanent magnet according to each of the above-described samples is calculated by simulation. This calculation is performed using a model illustrated in FIG. 1. The model is an IPM motor (simply referred to as a "motor") comprising: a 4-pole (inner) rotor (field element) that is composed of permanent magnets loaded in embedment-type slots; a stator (armature) that includes 24 coil slots; and a rotating shaft that is provided at the center.

The specs are as follows. The stator outer diameter is φ112 mm, the rotor outer diameter is φ55 mm, the axial length of the rotor (motor shaft length) is 60 mm, the current is 3-phase sine wave current of 5 A rms, the number of coil turns is 35 turns/slot, and the motor rotation speed is 6000 rpm, 30000 rpm, or 60000 rpm.

The rotor and stator casings (cores) are each formed of a laminate of electromagnetic steel sheets (non-oriented electromagnetic steel strips JNEH2000 available from JFE Steel Corporation, sheet thickness: 0.2 mm). The permanent magnets loaded in the slots of the rotor have a cuboid shape (plate shape) of 2.5×21.8×60 mm. The first electric resistivity and the second electric resistivity listed in Table 1 are employed as the electric resistivity in the axial direction and the electric resistivity in the direction perpendicular to the axial direction, respectively. The permanent magnets of an actual motor are fixed in the slots using an adhesive or the like, but the present simulation assumes that the permanent magnet are fitted in the slots without gaps.

(2) Analysis

At the same time as calculating the motor torque and the motor output P (kW) when the motor using the permanent magnets according to each sample are operated at the above-described rotation speed, an eddy current loss w (W) occurring in each permanent magnet at that time is calculated. When the Br of each permanent magnet is different, the generated torque is different, and the output is different regardless of the same rotation speed. Accordingly, when the eddy current loss w (W) occurring in each permanent magnet is normalized by the output P of the motor using the permanent magnet and the motor output is fixed to 10 kW (high output motor level), an eddy current loss $W_e$ (W) of the permanent magnet is calculated. The results thus obtained are also listed in Table 1.

Specifically, the eddy current loss $W_e$ of each permanent magnet at 10 kW is calculated by $W_e(W)=w(W)\times 10$ (kW)/P(kW). The relationship between the motor rotation speed and the eddy current loss occurring in the permanent magnets is illustrated in FIG. 2. Calculation results for Sample C0 (sintered magnet) are also plotted in FIG. 2 with a different scale width on the vertical axis. Magnetic field analysis software JMAG-Designer (available from JSOL Corporation) is used for the calculation of the eddy current loss.

«Evaluation»

(1) As apparent from Table 1, the compression-molded bonded magnets of Samples 1 to 3 have a high electric resistivity and a high degree of electric resistance anisotropy. Sample C1 is also a compression-molded bonded magnet, but it has a low electric resistivity and the electric resistance is isotropic (the degree of electric resistance anisotropy is 1).

The injection-molded bonded magnet of Sample C2 also has a relatively low electric resistance and the electric resistance is almost isotropic. Sample C2 contains a larger amount of resin than Sample C1 and the electric resistivity is higher accordingly. Sample C0 has, of course, an extraordinarily low electric resistivity and the electric resistance is almost isotropic.

(2) As apparent from Table 1 and FIG. 2, the eddy current loss of permanent magnets basically results in reflecting the electric characteristics of each permanent magnet. That is, when using the compression-molded bonded magnets (Samples 1 to 3, in particular Samples 2 and 3) whose first electric resistivity and degree of electric resistance anisotropy are high, the eddy current loss is smaller than 0.05 W even when the motor rotation speed reaches 60000.

It has been found that by using the compression-molded bonded magnets (Samples 1 to 3) as substitute for conventional rare-earth sintered magnets, the eddy current loss (e.g., eddy current loss when the motor rotation speed is 30000) can be drastically reduced to about 1/1400 to 1/120.

TABLE 1

| Sample No. | Manufacturing method | | Electric characteristics | | | Magnetic characteristics | | Eddy current loss $W_e$ (W) of permanent magnet | | |
|---|---|---|---|---|---|---|---|---|---|---|
| | Type | Impregnation with lubricating oil | First electric resistivity $\rho 1$ ($\mu\Omega m$) | Second electric resistivity $\rho 2$ ($\mu\Omega m$) | Degree of electric resistance anisotropy $\rho 1/\rho 2$ | Magnetic flux density Br (T) | Relative permeability | 6,000 rpm | 30,000 rpm | 60,000 rpm |
| 1 | Compression molding | Undone | 640 | 267 | 2.4 | 0.9 | 1.05 | 0.0035 | 0.0170 | 0.0350 |
| 2 | Compression molding | Done | 3100 | 1000 | 3.1 | 0.9 | | 0.0009 | 0.0042 | 0.0085 |
| 3 | Compression molding | Done | 10,000 | 3030 | 3.3 | 0.9 | | 0.0003 | 0.0015 | 0.0040 |
| C0 | Sintering | Undone | 1.5 | 1.6 | 0.9 | 1.25 | 1.05 | 2.02 | 2.12 | — |
| C1 | Compression molding | Undone | 56 | 55 | 1.0 | 1.00 | | 0.0500 | 0.1300 | 0.1800 |
| C2 | Injection molding | Undone | 210 | 150 | 1.4 | 0.74 | | 0.0103 | 0.0498 | 0.1018 |

The invention claimed is:

1. An electric motor comprising:
an armature;
a field element using a permanent magnet as a magnetic source; and
a rotating shaft rotating together with the armature or the field element,
the permanent magnet being a bonded magnet comprising magnet particles and a binder resin that binds the magnet particles to each other,
the bonded magnet having a degree of electric resistance anisotropy ($\rho 1/\rho 2$) of 2 or more, the degree of electric resistance anisotropy being a ratio of a first electric resistivity ($\rho 1$) in an axial direction and a second electric resistivity ($\rho 2$) in a direction perpendicular to the axial direction.

2. The electric motor according to claim 1, wherein the first electric resistivity is 300 $\mu\Omega m$ or more.

3. The electric motor according to claim 1, wherein when the bonded magnet as a whole is 100 mass % (simply referred to as "%"), the bonded magnet is a compression-molded bonded magnet that contains 93% to 98.5% of the magnet particles.

4. The electric motor according to claim 3, wherein the compression-molded bonded magnet further contains a lubricant.

5. The electric motor according to claim 4, wherein the lubricant is contained at 0.02% to 2.5% with respect to the compression-molded bonded magnet as a whole.

6. The electric motor according to claim 1, wherein the binder resin is a thermosetting resin.

7. A field element used in the electric motor according to claim 1.

* * * * *